(12) United States Patent
Sun et al.

(10) Patent No.: US 10,746,613 B1
(45) Date of Patent: Aug. 18, 2020

(54) HIGH-PRECISION FIBER BRAGG GRATING DISLOCATION SENSOR

(71) Applicants: Li Sun, Shandong (CN); Chunwei Zhang, Shandong (CN)

(72) Inventors: Li Sun, Shandong (CN); Chunwei Zhang, Shandong (CN); Ziqiang Xu, Liaoning (CN); Chuang Li, Liaoning (CN)

(73) Assignees: Li Sun, Qingdao, Shangdong (CN); Chunwei Zhang, Qingdao, Shangdong (CN)

(*) Notice: Subject to any disclaimer, the term of this patent is extended or adjusted under 35 U.S.C. 154(b) by 0 days.

(21) Appl. No.: 16/416,048

(22) Filed: May 17, 2019

(51) Int. Cl.
*G01L 1/00* (2006.01)
*G01L 1/24* (2006.01)
*G01D 5/353* (2006.01)
*G02B 6/293* (2006.01)

(52) U.S. Cl.
CPC .......... *G01L 1/242* (2013.01); *G01D 5/35316* (2013.01); *G02B 6/29317* (2013.01)

(58) Field of Classification Search
CPC . G01L 1/242; G01D 5/35316; G02B 6/29317
USPC ....................................................... 73/800
See application file for complete search history.

(56) References Cited

U.S. PATENT DOCUMENTS

| | | | | |
|---|---|---|---|---|
| 5,706,079 A | * | 1/1998 | Kersey | G01D 5/35316 356/482 |
| 9,360,643 B2 | * | 6/2016 | Rinzler | G02B 6/3813 |
| 2007/0069115 A1 | * | 3/2007 | Huang | G01B 11/18 250/227.14 |
| 2008/0317401 A1 | * | 12/2008 | Huang | G01L 11/025 385/13 |
| 2012/0272741 A1 | * | 11/2012 | Xiao | G01B 7/16 73/774 |
| 2014/0123764 A1 | * | 5/2014 | Abtahi | G01L 7/065 73/705 |

\* cited by examiner

*Primary Examiner* — Max H Noori
(74) *Attorney, Agent, or Firm* — Wayne & Ken, LLC; Tony Hom

(57) ABSTRACT

A high-precision fiber Bragg grating dislocation sensor, including a fiber Bragg grating, a loose tube, a tension spring, a sliding rod, a positioning piece, a sheath, a stainless steel tube, a transmission rod and a fastener. The sliding rod, the tension spring, the positioning piece, the fiber Bragg grating and the sheath are connected in series, and are provided in the precision stainless steel tube successively. The mechanism of the dislocation sensor is that an elastic force, converted from the local uneven settlement of the settlement joint, is applied on the bare fiber Bragg grating, so that the bare fiber Bragg grating suffers an axial stress and a strain is generated by itself, and the central wavelength of the fiber Bragg grating is further changed, allowing for the monitoring of settlement.

3 Claims, 4 Drawing Sheets

HIGH-PRECISION FIBER BRAGG GRATING DISLOCATION SENSOR

TECHNICAL FIELD

The present invention relates to optical fiber sensing, and more particular to a high-precision fiber Bragg grating dislocation sensor based on fiber Bragg grating for real-time monitoring of relative settlement of structures on two sides of settlement joints of utility tunnels.

BACKGROUND OF THE INVENTION

In recent years, utility tunnels, as an important part of the sustainable development of urban underground space, are developed rapidly, and buried pipelines such as pipelines for electricity, communication, gas, water supply, drainage, heat, and television network are set in the utility tunnel in the same tunnel space. The utility tunnel has the advantages of high levels of modernization and intensification, and is easy to be collaboratively maintained and intensively managed. However, the local uneven settlement will inevitably occur due to long longitudinal sections of the utility tunnel structures, which leads to pipeline fractures and causes hazards like fires or even explosions. Therefore, timely and accurate acquisition of local uneven settlement information of the utility tunnel is of great importance. Monitoring the relative settlement of the settlement joints of the utility tunnel in real-time allows the warnings of the over-limit part being provided in advance, which will control the excavation speed of a foundation and precipitation speed during the development of the surrounding area, and prevent accidents by avoiding damaging pipeline in the utility tunnel. Fiber Bragg grating is suitable for well long-term monitoring of complex underground projects due to characteristics of high sensitivity, anti-electromagnetic interference and corrosion resistance. Necessarily, a high-precision fiber Bragg grating dislocation sensor should be developed for long-term and real-time monitoring of the relative settlement state of the settlement joints of the utility tunnel.

SUMMARY OF THE INVENTION

The present invention is fiber Bragg grating dislocation sensor which has a stable performance, high sensitivity and anti-electromagnetic interference, and is reliable. It can meet requirements of long-term and real-time monitoring for utility tunnels and dams, and can be used for monitoring relative settlement state of the structures on two sides of the settlement joint of a utility tunnel and a dam body.

In order to achieve the above purposes, the following technical solutions are provided by the present invention.

A high-precision fiber Bragg grating dislocation sensor, comprising a fiber Bragg grating, a loose tube, a tension spring, a sliding rod, a positioning piece, a sheath, a stainless steel tube and a transmission rod; wherein the sliding rod, the tension spring, the positioning piece and the fiber Bragg grating are connected in series in the stainless steel tube, and the sliding rod is arranged at a front end of the stainless steel tube; a front end of the sliding rod is arranged outside the stainless steel tube; a rear end of the sliding rod is connected to a front end of the tension spring by a stainless steel ring, and a rear end of the tension spring is connected to the positioning piece; one end of the fiber Bragg grating is glued to a symmetry axis of the positioning piece, and the other end is fitted with the loose tube, which is led out of the stainless steel tube through the sheath (PVC); an outer wall of the sheath abuts an inner wall of a rear end of the stainless steel tube; a front end of the sliding rod is fixed on a wall by a straight fastener; the outer side of a middle portion of the stainless steel tube is connected to a front end of the transmission rod through a fixed T-shaped fastener, and a rear end of the transmission rod is fixed on the wall by a straight fastener; and the fiber Bragg grating is a Bragg grating.

The tension spring, the sliding rod, the transmission rod and the positioning piece are made of 304 stainless steel.

The present invention has the following advantages and effects.

1. The present invention has high monitoring precision, and the packaging error has a small impact on the sensor. The present invention adopts a bare fiber Bragg grating, which will generate strain under a directly applied force, and further change the wavelength which will allow the displacement being monitored. The fiber Bragg grating is not bonded on the substrate, so that the deformation capability of the fiber Bragg grating itself is fully utilized, and the monitoring sensitivity is improved. In addition, the initial deformation of the fiber Bragg grating during the bonding process is avoided, and the monitoring precision of the sensor is significantly improved.

2. Measurement precision can be adjusted. In the present invention, an elastic force, converted from the relative displacement through a tension spring, is applied on the bare fiber Bragg grating and further causes an axial deformation of the fiber Bragg grating, from which the wavelength changes is obtained. Therefore, the stiffness of the spring directly affects the change of the central wavelength of the grating. Thus the measurement precision can be flexibly changed by selecting springs with different stiffness.

3. The present invention has high stability and low production cost. In the present invention, 304 stainless steel and PVC mixed material are adopted as the packaging materials, which are low in cost, easy to manufacture and stable, offering great protection for the fiber Bragg grating because of the great corrosion resistance.

4. The fiber Bragg grating dislocation sensor with a compact structure can be used in a wide range of applications. It is suitable to monitor the relative settlement of various structures under different environments by modifying the fixed mode. The fiber Bragg grating dislocation sensor has the simple structure, high measurement precision, good stability, high sensitivity, anti-electromagnetic interference and corrosion resistance, and is easy to be processed and manufactured, thus having the good applicability and expandability.

DETAILED DESCRIPTION OF EMBODIMENTS

The present invention will be further described in detail below with reference to the embodiments. However, the scope of the present invention is not limited by the embodiments, but are limited to the appended claims. In addition, any changes or modifications that are easily made by those skilled in the art without departing from the spirit of the present invention will fall within the scope of the appended claims.

Figure 1:
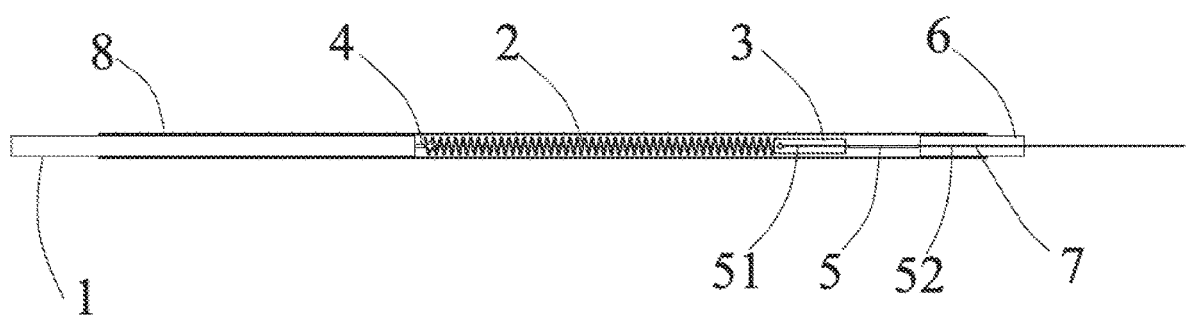
FIG. 1 is a front sectional view of a high-precision fiber Bragg grating dislocation sensor of the present invention.
Figure 2:
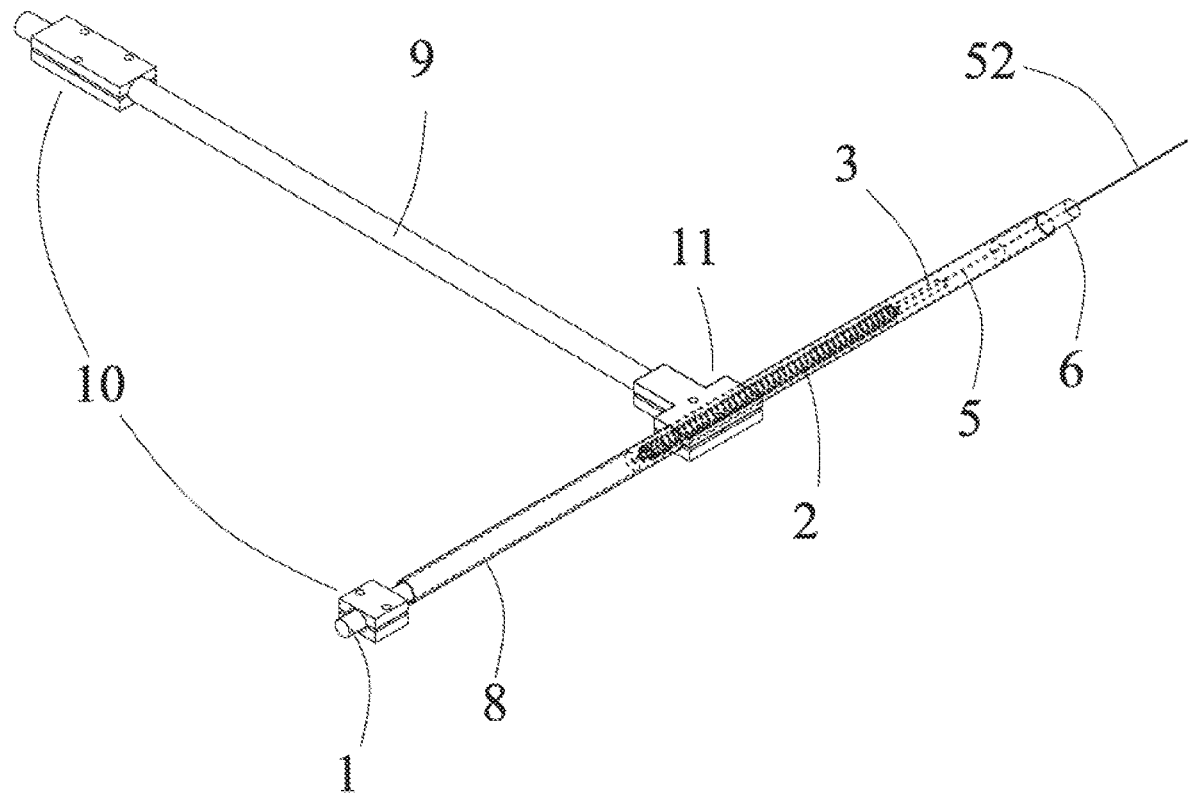
FIG. 2 is a perspective view of the high-precision fiber Bragg grating dislocation sensor of the present invention.
Figure 3:
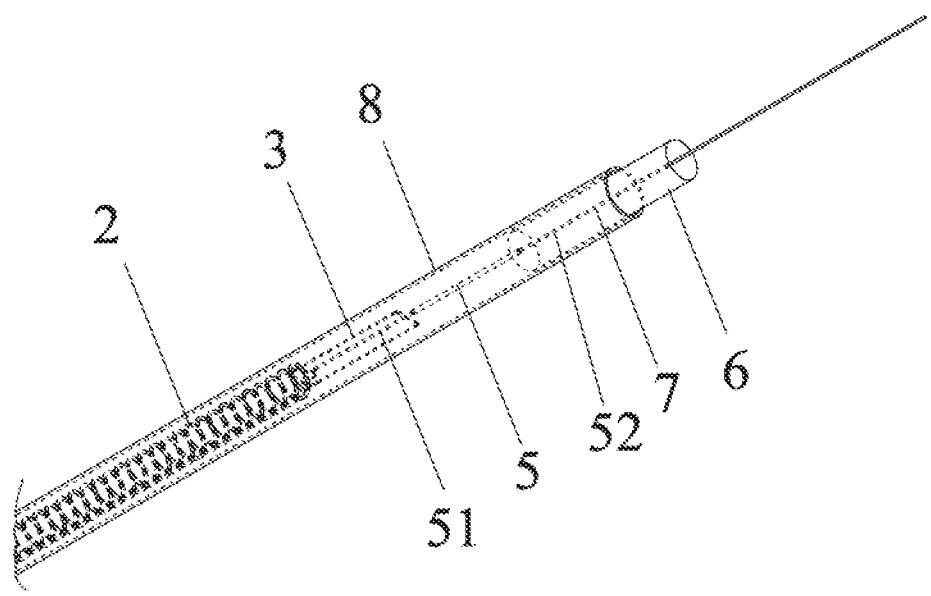
FIG. 3 is a close-up view of the fiber Bragg grating of the present invention.
Figure 4:
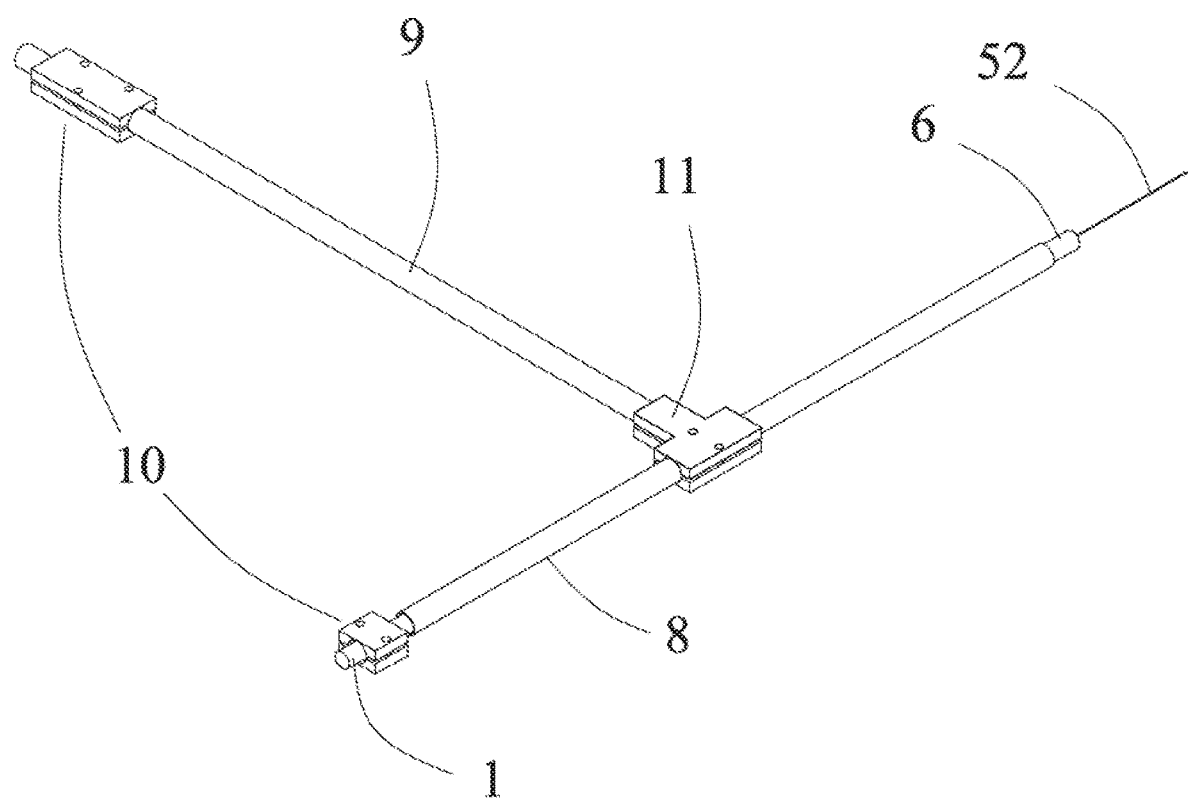
FIG. 4 is a schematic view of the high-precision fiber Bragg grating dislocation sensor of the present invention.

As shown in FIGS. 1-4, provided is a high-precision fiber Bragg grating dislocation sensor comprising: a fiber Bragg grating 5, a loose tube 7, a tension spring 2, a sliding rod 1, a positioning piece 3, a sheath 6, a stainless steel tube 8 and a transmission rod 9.

The sliding rod 1, the tension spring 2, the positioning piece 3 and the fiber Bragg grating 5 are connected in series in the stainless steel tube 8, and the sliding rod 1 is arranged at a front end of the stainless steel tube 8. A front end of the sliding rod 1 is arranged outside the stainless steel tube 8. A rear end of the sliding rod 1 is connected to a front end of the tension spring 2 by a stainless steel ring 4, and a rear end of the tension spring 2 is connected to the positioning piece 3.

The positioning piece 3 is bonded to a front pigtail 51 of the fiber Bragg grating 5. A rear pigtail 52 of the fiber Bragg grating 5 is sleeved with the loose tube 7 which is sheathed with the sheath 6. An outer wall of the sheath 6 abuts an inner wall of a rear end of the stainless steel tube 8. A front end of the sliding rod 1 is fixed on a wall by a straight fastener 10.

An outer side of a middle portion of the stainless steel tube 8 is connected to a front end of the transmission rod 9 through a fixed T-shaped fastener 11, and a rear end of the transmission rod 9 is fixed on the wall by a straight fastener 10. The fiber Bragg grating is a Bragg grating.

The tension spring 2, the sliding rod 1, the transmission rod 9 and the positioning piece 3 are made of 304 stainless steel.

The working principle of the high-precision fiber Bragg grating dislocation sensor for real-time monitoring of the relative settlement of the sides of the settlement joint of the utility tunnel is as follows.

When the sliding rod 1 has a relative displacement $\Delta x$, the tension spring 2 generates an elastic force N, an axial force N is applied on the fiber Bragg grating 5, and the fiber Bragg grating 5 generates a strain. According to the basic principles of material mechanics, the relationship between them meets the following equations:

$$N = k_\alpha \cdot \Delta x \quad (1)$$

$$\sigma = \frac{2N}{\pi r^2} \quad (2)$$

$$\sigma = E \cdot \varepsilon \quad (3)$$

where $k_\alpha$ is the stiffness of the tension spring 2; $\sigma$ is the axial stress of the fiber Bragg grating 5; r is the radius of the fiber Bragg grating 5; and E is the elastic modulus of the fiber material.

Equation (4) can be obtained according to equations (1), (2) and (3)

$$\Delta x = \frac{\pi r^2 E}{2 k_\alpha} \cdot \varepsilon. \quad (4)$$

Without taking into account the central wavelength change caused by temperature, the principle of the fiber Bragg grating (FBG) 5 working principle is expressed by $$\frac{\Delta \lambda_B}{\lambda_B} = K_\varepsilon \cdot \varepsilon; \quad (5)$$

where $K_\varepsilon = 1 - Pe$.

Equation (6) can be obtained according to equations (4) and (5)

$$\frac{\Delta \lambda_B}{\Delta x} = \frac{2 k_\alpha k_\varepsilon}{\pi r^2 E} \cdot \lambda_B. \quad (6)$$

Equation (6) is the theoretical formula of the dislocation sensor, and a linear relationship between the relative settlement $\Delta x$ and the grating central wavelength change $\Delta \lambda_B$ scan be obtained from the equation (6). Therefore, the relative settlement $\Delta x$ is obtained by monitoring the central wavelength change $\Delta \lambda_B$.

Packaging of the dislocation sensor based on fiber Bragg grating for real-time monitoring of the relative settlement of utility tunnel is described as follows.

The front pigtail 51 and the rear pigtail 52 of the fiber Bragg grating 5 are processed such that a length of the front pigtail 51 is 1.5 cm, and a length of the rear pigtail 52 is 30 cm and is sheathed with the loose tube 7 having a length of 25 cm. A small amount of 704 silicone rubber is applied to the rear pigtail 52, and a grating region is not processed.

Solders on both ends of the sliding rod 1 are melt by a soldering iron, and the sliding rod is welded with the stainless steel ring 4. One end of the stainless steel ring 4 is tied with a thin copper wire, and the other end of the stainless steel ring 4 is attached to one end of the tension spring 2, and the other end of the tension spring 2 is hooked with a circular hole of the positioning piece 3. The front pigtail 51 of the fiber Bragg grating 5 is bonded to a symmetry axis of the positioning piece 3 by ethyl cyanoacrylate, and the rear pigtail 52 is inserted into the sheath 6, where the sheath is made of PVC. During the assembling, the sliding rod 1 is inserted into the stainless steel tube 8, where the stainless steel tube 8 is a 304 precision stainless steel tube. The copper wire is led out and gently pulled, so that all the components connected in series are led into the stainless steel tube 8. One half of the sheath 6 is inserted into the stainless steel tube 8, and one end of the sheath 6 is provided with an EVA heat-shrink tubing which is shrunk when heated for port protection. The copper wire is then untied, and the exposed stainless steel ring 4 of the sliding rod 1 is removed. The packaging process is completed.

We claim:

1. A high-precision fiber Bragg grating dislocation sensor, comprising:
   a fiber Bragg grating,
   a loose tube,
   a tension spring, a sliding rod,
   a positioning piece,
   a sheath,
   a stainless steel tube, and
   a transmission rod,
   wherein the sliding rod, the tension spring, the positioning piece and the fiber Bragg grating are connected in series in the stainless steel tube, and the sliding rod is arranged at a front end of the stainless steel tube; a front end of the sliding rod is arranged outside the stainless steel tube, and a rear end of the sliding rod is connected to a front end of the tension spring by a stainless steel ring, and a rear end of the tension spring is connected to the positioning piece;

one end of the fiber Bragg grating is glued to a symmetry axis of the positioning piece, and the other end is fitted with the loose tube, which is led out of the stainless steel tube through the sheath; an outer wall of the sheath abuts an inner wall of a rear end of the stainless steel tube;

the front end of the sliding rod is fixed on a wall by a straight fastener;

an outer side of a middle portion of the stainless steel tube is connected to a front end of the transmission rod through a fixed T-shaped fastener, and a rear end of the transmission rod is fixed on the wall by a straight fastener.

2. The sensor of claim 1, wherein the fiber Bragg grating is a Bragg grating.

3. The sensor of claim 1, wherein the tension spring, the sliding rod, the transmission rod and the positioning piece are made of 304 stainless steel.

\* \* \* \* \*